(12) United States Patent
Andersson et al.

(10) Patent No.: US 7,647,063 B2
(45) Date of Patent: Jan. 12, 2010

(54) METHOD AND SYSTEM FOR OUTER LOOP POWER CONTROL

(75) Inventors: Lennart Andersson, Hjärnarp (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1454 days.

(21) Appl. No.: 10/763,969

(22) Filed: Jan. 23, 2004

(65) Prior Publication Data

US 2005/0085255 A1    Apr. 21, 2005

Related U.S. Application Data

(60) Provisional application No. 60/511,640, filed on Oct. 17, 2003.

(51) Int. Cl.
*H04B 7/00* (2006.01)

(52) U.S. Cl. .................. 455/522; 455/69; 455/13.4; 455/67.13; 455/135; 455/517; 370/318

(58) Field of Classification Search .......... 455/522, 455/69, 13.4, 67.11, 67.13, 127.1, 127.4, 455/135, 422.1, 517; 370/318, 342
See application file for complete search history.

(56) References Cited

U.S. PATENT DOCUMENTS

| 6,374,118 | B1 | 4/2002 | Toskala et al. | |
|---|---|---|---|---|
| 7,437,160 | B2 * | 10/2008 | Hamalainen et al. | 455/436 |
| 2002/0187802 | A1 | 12/2002 | Agin et al. | |
| 2003/0054849 | A1 | 3/2003 | Koo et al. | |
| 2004/0137860 | A1 * | 7/2004 | Oh et al. | 455/127.1 |

FOREIGN PATENT DOCUMENTS

| EP | 1 353 456 A1 | 10/2003 |
|---|---|---|
| EP | 1 361 677 A1 | 11/2003 |
| WO | WO 02/43275 A2 | 5/2002 |
| WO | WO 03/017527 A2 | 2/2003 |
| WO | WO 2004/070984 A2 | 8/2004 |

OTHER PUBLICATIONS

PCT International Preliminary Report on Patentability, dated Feb. 15, 2006, in connection with International Application No. PCT/EP2004/011388.
PCT International Search reported dated Jun. 22, 2005, in connection with International Application No. PCT EP 2004/011388.
PCT Written Opinion dated Jun. 22, 2005, in connection with International Application No. PCT EP 2004/011388.

(Continued)

*Primary Examiner*—Matthew D Anderson
*Assistant Examiner*—Shaima Q Aminzay
(74) *Attorney, Agent, or Firm*—Potomac Patent Group PLLC

(57) ABSTRACT

Methods and apparatus are described for improving convergence time of a reference signal-to-interference (SIR) value calculated in outer loop power control for use in inner loop power control. Instead of considering only error rate information for each transport channel individually, other information, such as quality information from other transport channels and block rate information for the channel, is also considered to determine the reference SIR. By considering such other information, an improved outer loop power control is achieved, thus reducing the power needed for the physical channel and increasing the capacity of the communication system.

26 Claims, 12 Drawing Sheets

OTHER PUBLICATIONS

'Online! XP002317700 Retrieved from the Internet: URL: http://www.3gpp.org/ftp/tsg_ran/WG1_RL1/TSGR1_10/Liaison%20Statements/Incoming/PDFs/R1-00-0183.pdf> 'retrieved on Jan. 18, 2000! (abstract).

'Online! XP002317682 Retrieved from the Internet: URL: http://www.3gpp/ftp/tsg_ran/WG4_Radio/TSGR4_09/Docs/Zips/R4-99850.zip> 'retrieved on Dec. 7, 1999! (abstract).

* cited by examiner

METHOD AND SYSTEM FOR OUTER LOOP POWER CONTROL

RELATED APPLICATIONS

This application is related to, and claims priority from, U.S. Provisional Application Ser. No. 60/511,640 entitled "Improved Outer Loop Power Control at Low Block Rates" filed on Oct. 17, 2003, the disclosure of which is expressly incorporated herein by reference.

BACKGROUND

The invention relates to the control of power levels of transmitted signals in telecommunication systems, in particular cellular spread spectrum systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and WCDMA telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for simplicity, but it will be understood that the principles described in this application can be implemented in other digital communication systems.

WCDMA is based on direct-sequence spread-spectrum techniques. Two different codes are used for separating base stations and physical channels in the downlink (base-to-terminal) direction. Scrambling codes are pseudo-noise (pn) sequences that are mainly used for separating the base stations or cells from each other. Channelization codes are orthogonal sequences that are used for separating different physical channels (terminals or users) in each cell or under each scrambling code. Since all users share the same radio resource in CDMA systems, it is important that each physical channel does not use more power than necessary. This is achieved by a transmit power control mechanism in which the terminal estimates the signal-to-interference ratio (SIR) for its dedicated physical channel (DPCH), compares the estimated SIR against a reference value, and informs the base station to adjust the base station's transmitted DPCH power to an appropriate level. WCDMA terminology is used here, but it will be appreciated that other systems have corresponding terminology.

The 3GPP is working on an evolution of WCDMA known as high speed downlink packet data access (HSDPA). This enhancement to prior systems increases capacity, reduces round-trip delay, and increases peak data rates up to 8-10 Mbit/s.

Generally speaking, transport channels are used for carrying user data via a dedicated or common physical channel. For HSDPA, the transport channel is a high-speed downlink shared channel (HS-DSCH). A corresponding physical channel is denoted by high speed physical downlink shared channel (HS-PDSCH). The HS-DSCH code resources include one or more channelization codes with a fixed spreading factor of 16. In order to leave sufficient room for other required control and data bearers, up to 15 such codes can be allocated. The available code resources are primarily shared in the time domain. For example, they may be allocated to one user at a time. Alternatively, the code resources may be shared using code multiplexing. In this case, two to four users share the code resources within a same transmission time interval (TTI).

In addition to user data, it is also necessary to transmit control signaling to notify the next user equipment (UE), such as a mobile station, personal digital assistant (PDA), or other receiver, to be scheduled. This signaling is conducted on a high-speed shared control channel (HS-SCCH), which is common to all users. The HSDPA concept also calls for an additional high-speed dedicated physical control channel (HS-DPCCH) in the uplink for carrying the Channel Quality Indicator (CQI) information in addition to the H-ARQ acknowledgements.

FIG. 1 depicts a communication system, such as a WCDMA system, that includes a base station (BS) 100 handling connections with four UEs 1, 2, 3, 4 that each uses downlink (i.e., base-to-UE or forward) and uplink (i.e., UE-to-base or reverse) channels. In the downlink, BS 100 transmits to each UE at a respective power level, and the signals transmitted by BS 100 are spread using orthogonal code words. In the uplink, UE 1-UE 4 transmit to BS 100 at respective power levels. Although not shown, BS 100 also communicates with a radio network controller (RNC), which in turn communicates with a public switched telephone network (PSTN).

The signals transmitted in the exemplary WCDMA system depicted in FIG. 1 can be formed as follows. An information data stream to be transmitted is first multiplied with a channelization code and then the result is multiplied with a scrambling code. The multiplications are usually carried out by exclusive-OR operations, and the information data stream and the scrambling code can have the same or different bit rates. Each information data stream or channel is allocated a unique channelization code, and a plurality of coded information signals simultaneously modulate a radio-frequency carrier signal. At a UE (or other receiver), the modulated carrier signal is processed to produce an estimate of the original information data stream intended for the receiver. This process is known as demodulation.

Good transmit power control methods are important for WCDMA (and other) communication systems having many transmitters that transmit simultaneously to minimize the mutual interference of such transmitters while assuring high system capacity. Depending upon the system characteristics, power control in such systems can be important for transmission in the uplink, the downlink, or both. To achieve reliable reception of a signal at each UE, the SIR of the received signal should exceed a prescribed threshold for each UE. For example, as shown in FIG. 1, consider the case in which the UEs receive, respectively, four signals on a common WCDMA communication channel. Each of the signals has a corresponding energy level associated with it, namely energy levels E1, E2, E3, and E4, respectively. Also present on the communication channel is a certain level of noise (N). For a given UE 1 to properly receive its intended signal, the ratio between E1 and the aggregate levels of E2, E3, E4, and N must be above the given UE's prescribed threshold SIR.

To improve the SIR of a received signal, the power of the transmitted signal may be increased, depending on the SIR measured at the receiver. Power, however, is an important resource in a WCDMA system. Since different channels are transmitting simultaneously at the same frequency, it is important to keep the power level on each physical channel as low as possible while still maintaining an acceptable error rate of the received blocks of user data on the transport channel, i.e., block error rate (BLER).

Downlink power control can be logically divided into an "inner loop" and an "outer loop," where the inner loop controls the SIR by sending transmission power control (TPC) commands to the base station and the outer loop controls the quality, in terms of BLER, by providing SIR references to the inner loop.

Conventional power control techniques compute one SIR reference for each transport channel, based on the BLER and the BLER reference for that transport channel, and the maximum of these SIR references is used by the inner loop. A conventional power control system is illustrated by the block diagram of FIG. 2. Each transport channel 201, 202, etc., communicating via a physical channel of the system 200 has an associated BLER controller 211, 212, etc., that determines the current BLER and compares it to a target BLER (also referred to as a BLER reference) $BLER_{ref}$ for the channel to produce an SIR reference, $SIR_{ref}$ for the associated channel. The $SIR_{ref}$ represents a target SIR for the channel. The $BLER_{ref}$ for a channel is established by the system according to quality requirements for the data being transported over the channel, and other parameters. For example, voice data may have a higher quality requirement than text data. These quality requirements are typically signaled on a higher layer communication. A maximum one of the SIR references is determined 220 and forwarded to the SIR controller 230. The SIR controller 230 generates the inner loop power control commands 240 based on $SIR_{ref}$ and the current SIR.

The objective of outer loop power control is to keep the BLER on each transport channel below their BLER reference while minimizing the power demands. The BLER control 211, 212, etc., for each transport channel includes a BLER estimator and controls the respective $SIR_{ref}$ to keep the estimated BLER close to, but below the BLER reference value, $BLER_{ref}$, for the channel. The current BLER is estimated based on a cyclic redundancy check (CRC) of the respective transport channel, which is typically either a "1" when an incorrect block is received or a "0" when a correct block is received. The BLER can therefore be simply determined based on the ratio of incorrect blocks (having a CRC of "1") to the overall number of blocks received. Each controller 211, 212, etc., computes a corresponding $SIR_{ref}$ which is updated as each new block is received. The $SIR_{ref}$ for a given channel increases as the BLER increases, since increasing the SIR reference value results in a demand for a higher SIR of the current signal. The $SIR_{ref}$ having the highest value among the ones from the transport channels 201, 202, etc., is compared by the SIR controller 230 to the current SIR for the physical channel of the system 200 to produce the inner loop power control commands 240 to adjust power on the physical channel. The highest $SIR_{ref}$ is used since it corresponds to the transport channel having the highest BLER, i.e., needing the most attention in terms of increasing the SIR.

The Association of Radio Industries and Businesses' (ARIB) "Specifications of Air-Interface for 3G Mobile System" specifies a simple method for outer loop control using an algorithm referred to as a "jump algorithm." In the jump algorithm, the BLER is represented by a CRC. The error e is the difference between the CRC and the BLER reference, as shown in Equation (1), which is integrated to obtain the SIR reference according to Equation (2).

$$e = CRC - BLER_{ref} \quad (1)$$

$$SIR_{ref}(k+1) = SIR_{ref}(k) + Ke(k) \quad (2)$$

where K is gain applied.

The jump algorithm is updated each time a new block is received on the transport channel. The $SIR_{ref}$ "jumps" to a higher value each time a given TTI contains a block error. The SIR reference provided by the conventional jump algorithm results in large variations. Consequently, as can be appreciated from FIG. 2, the power will have large variations. Smaller power variations can be obtained if the CRC information is filtered to produce a BLER estimate, $BLER_{est}$, before being used by the controller, in which case Equation (1) becomes Equation (3). A BLER estimate can be obtained according to Equation (4).

$$e = BLER_{est} - BLER_{ref} \quad (3)$$

$$BLER_{est}(k+1) = \alpha \cdot BLER_{est}(k) + (1\alpha - \beta) * CRC(k) + \beta \cdot CRC(k+1) \quad (4)$$

where $\alpha$ and $\beta$ are constants, $\alpha$ determining the time constant of the filter chosen based on the $BLER_{ref}$ according to, for example, $\alpha = 10^{-0.1 \ BLER_{ref}}$, so that the estimates of the BLER are based on roughly the same number of block errors.

The problem with the conventional power control methods today, such as the jump algorithm, is that the convergence of the SIR reference is slow when the number of received blocks over a given TTI, i.e., the block rate (BLR), on the transport channel is low. This occurs because the controller is updated less and less frequently as the BLR decreases, resulting in slower convergence. This is illustrated in the graph of FIG. 3, where a jump algorithm-based controller is used to generate an SIR reference at three different BLRs, a 100% BLR 320, a 10% BLR 310, and a 1% BLR 300. As can be appreciated from the graph, as the BLR decreases, the convergence takes longer.

Slow convergence results in poor channel quality or higher than necessary power demands. It is especially problematic when the SIR reference is far from the correct level, since either the BLER or the power level will remain too high over an extended period of time, thus reducing system capacity. A typical situation where the SIR reference is too high is at initialization, where a high SIR reference is used to guarantee reception of the first data blocks. Accordingly, there is a need for innovative power control techniques that improve convergence time and thereby reduce the power level required by a physical channel.

SUMMARY

Methods and apparatus are described for improving convergence time of a reference SIR calculated in outer loop power control for use in inner loop power control. Instead of considering only error rate information for each transport channel individually, other information, such as quality information from other transport channels and block rate information for the channel, is also considered to determine the reference SIR. By considering such other information, an improved outer loop power control is achieved, thus reducing the power needed for the physical channel and increasing the capacity of the communication system.

In one aspect, a method for controlling power in a communication system includes determining a BLER based on data blocks received on a first transport channel and data blocks of at least a second transport channel. A reference SIR value corresponding to the first transport channel is determined based on the BLER and a target BLER for the first transport channel The reference SIR value may be compared to at least one other reference SIR value corresponding to another transport channel so a maximum one of the compared reference SIR values is used for controlling power.

In another aspect, an apparatus for controlling power in a communication system includes logic that determines a BLER based on data blocks received on a first transport channel and data blocks of at least a second transport channel. There is also logic that logic that determines an SIR value corresponding to the first transport channel based on the BLER and a target BLER for the first transport channel.

Logic may be included that compares the reference SIR value to at least one other reference SIR value corresponding to another transport channel and selects a maximum one of the compared reference SIR values to be used for controlling power.

In yet another aspect, a method for controlling power in a communication system includes determining a common BLER of data blocks received on a plurality of transport channels. A common target BLER for the plurality of transport channels is determined. A reference SIR value corresponding to the plurality of transport channels is determined based on the common BLER and the target BLER. The reference SIR is used for controlling power.

In yet another aspect, an apparatus for controlling power in a communication system includes logic that determines a common BLER of data blocks received on a plurality of transport channels. Logic is also included that determines a common target BLER for the plurality of transport channels and that determines a reference SIR value corresponding to the plurality of transport channels based on the common BLER and the target BLER, where the reference SIR is used for controlling power.

In yet another aspect, a method for controlling power in a communication system includes determining a BLER of data blocks received on a transport channel. A BLR of the data blocks received on the transport channel is estimated. a reference SIR value corresponding to the transport channel is determined based on the BLER, a target BLER, and the estimated BLR. The reference SIR is considered in controlling power.

In yet another aspect, an apparatus for controlling power in a communication system includes logic that determines a BLER of data blocks received on a transport channel. Logic is also included that estimates a BLR of the data blocks received on the transport channel and determines a reference SIR value corresponding to the transport channel based on the BLER, a target BLER, and the estimated BLR, where the reference SIR is considered in controlling power.

In yet another aspect, a method for controlling power in a communication system includes adjusting a reference SIR value downward incrementally. At least one transport channel associated with the reference SIR is monitored for block errors. An initial reference SIR value for each of the at least one transport channels is set to the incrementally adjusted reference SIR value when a predetermined number of errors are received cumulatively on any of the at least one transport channels.

In yet another aspect, an apparatus for controlling power in a communication system includes logic that adjusts a reference SIR value downward incrementally and logic that monitors at least one transport channel associated with the reference SIR for block errors. The apparatus includes additional logic that sets an initial reference SIR value for each of the at least one transport channels to the incrementally adjusted reference SIR value when a predetermined number of errors are received cumulatively on any of the at least one transport channels.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer readable medium for use by or in connection with an instruction execution system, apparatus, or device, such as a computer based system, processor containing system, or other system that can fetch the instructions from a medium and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

Thus, the invention can be embodied in many different forms, and all such forms are contemplated to be within the scope of what is claimed. Any such form of embodiment can be referred to herein as "logic configured to" perform a described action, or alternatively as "logic that" performs a described action.

In order to address the shortcomings of conventional methods, convergence time at low BLRs must be reduced. A transport channel with a reduced BLR will have a proportionally reduced rate of information about the BLER available. Applicants describe various ways to compensate for this reduction of information by using information from other transport channels and/or by taking steps to increase confidence in the available information.

Figure 1:
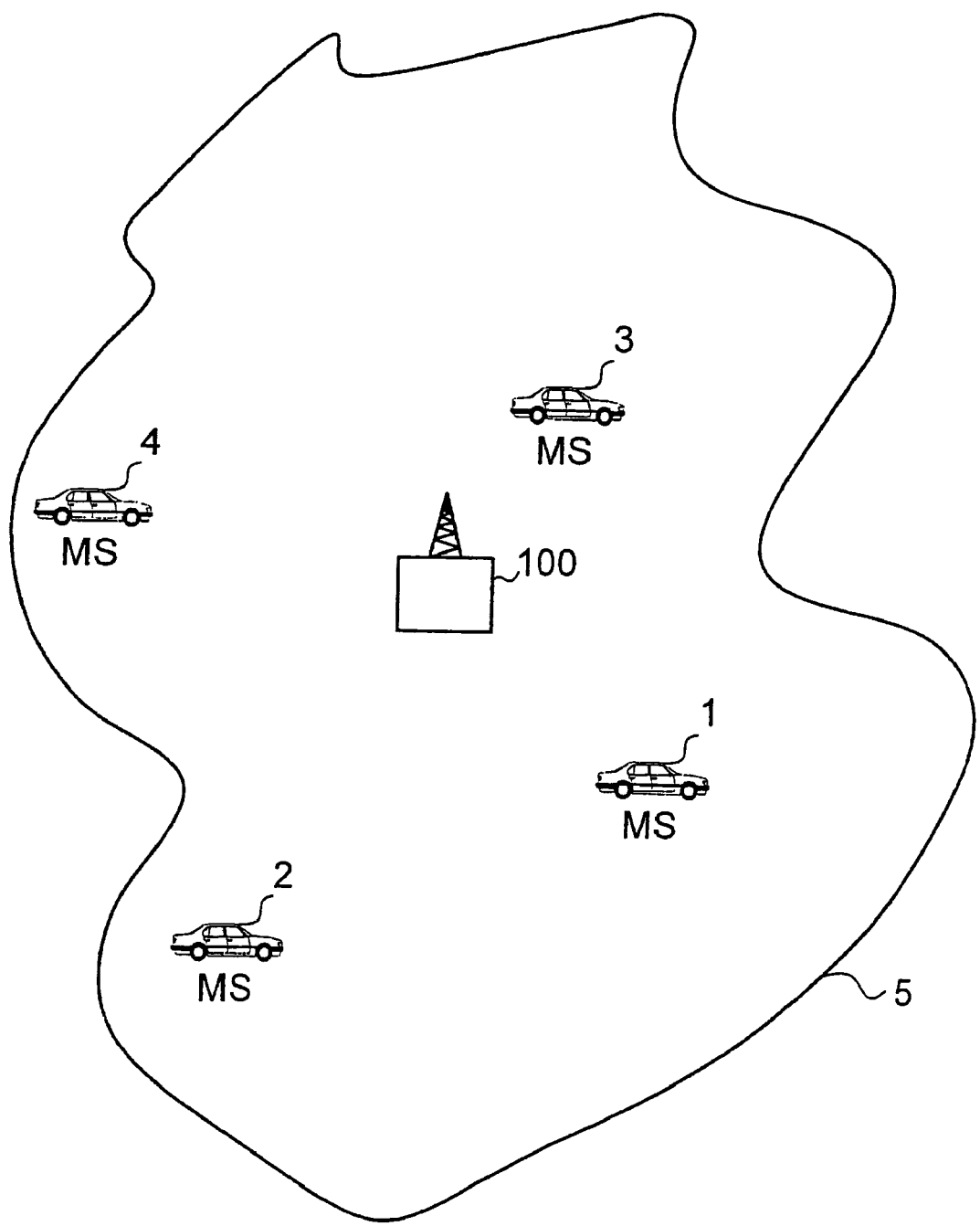
FIG. 1 is a diagram illustrating a conventional communication system.
Figure 2:
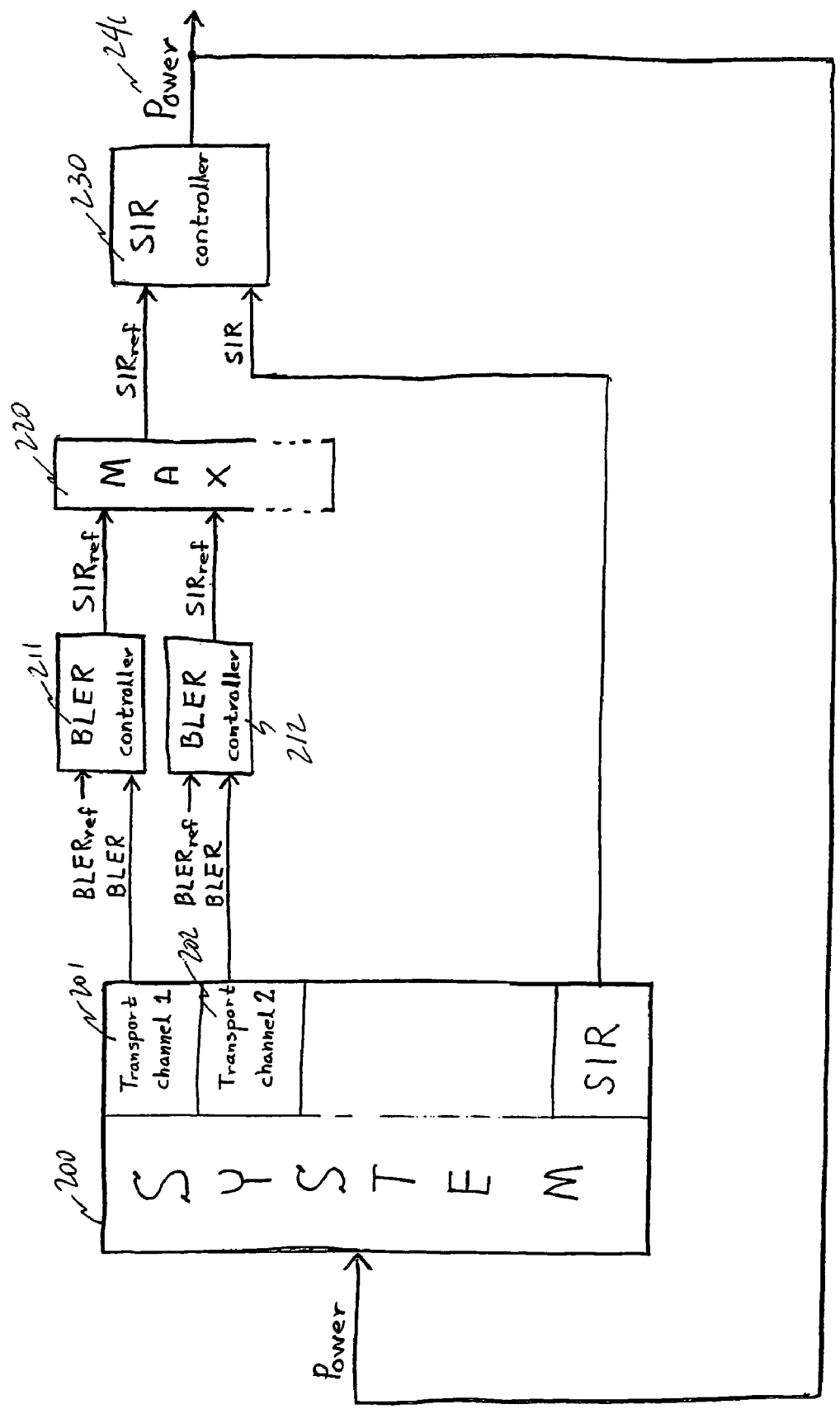
FIG. 2 is a block diagram illustrating conventional power control techniques.
Figure 3:
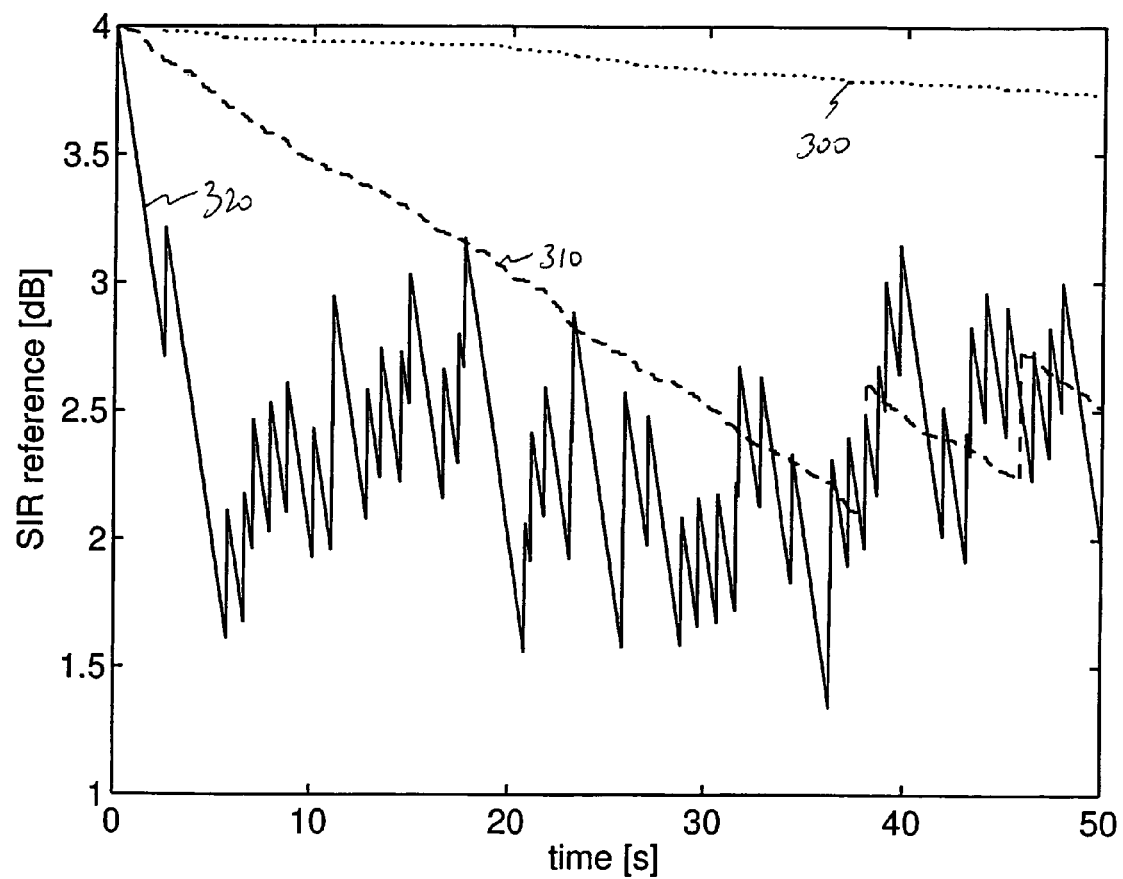
FIG. 3 is a graph illustrating the effect of block rates on convergence.
Figure 4:
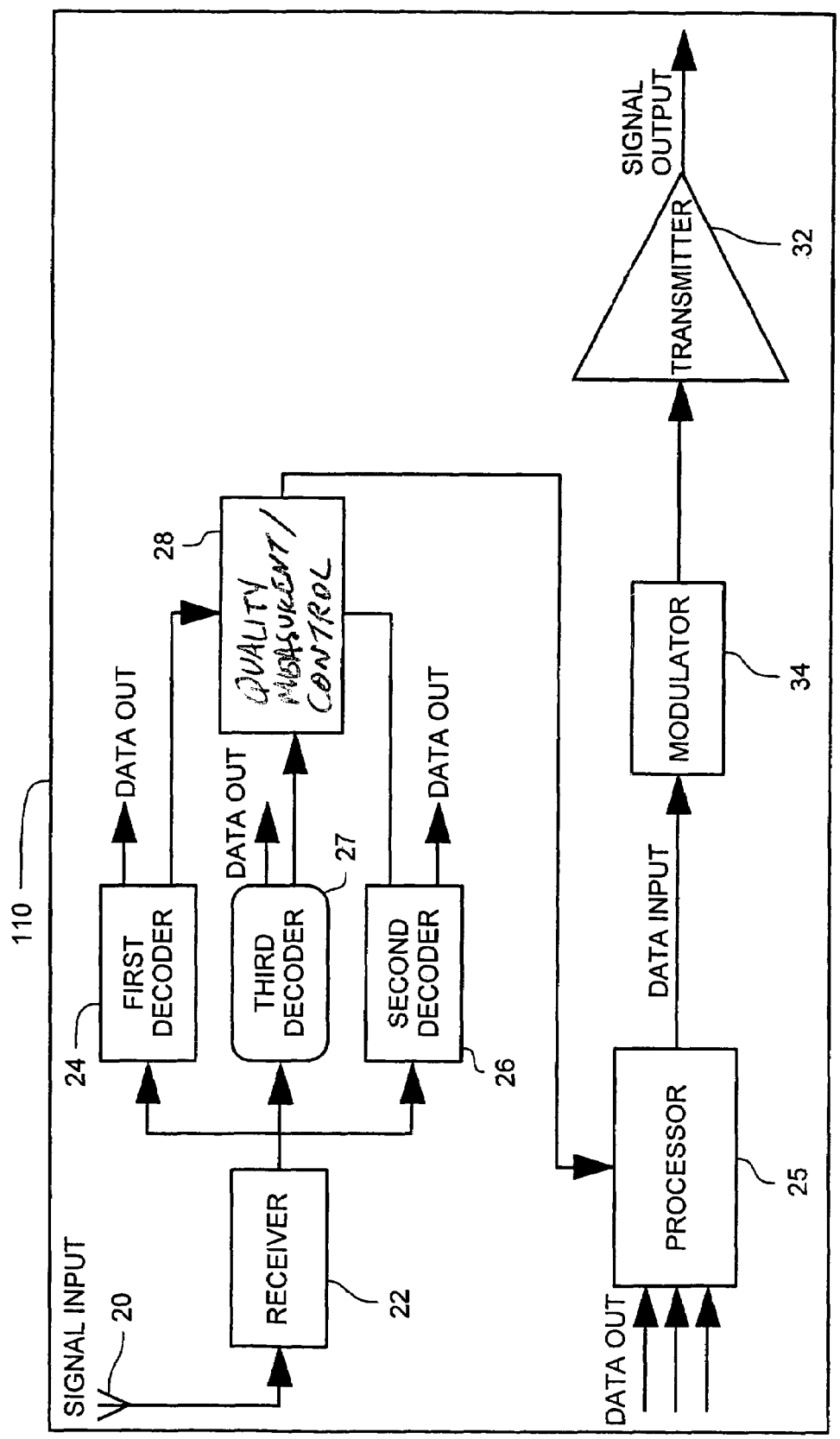
FIG. 4 is a block diagram illustrating user equipment logic according to an aspect of the invention.

In FIG. 4, an exemplary transceiver is shown. For the purposes of this description, the transceiver may be considered to be within a UE 110. However, it will be appreciated that a BS may contain similar components. As shown in FIG. 4, a UE includes a receiver 22 which operates in a conventional manner to filter, amplify and demodulate a signal from an antenna 20. A first decoder 24 is provided for selectively receiving and decoding a signal transmitted from the BS on a transport channel. Likewise, signals on other channels are decoded at second and third decoders 26 and 27, respectively. The output data from these decoders is used by the processor 25 in a known manner to reconstruct and output the conveyed information, e.g., to provide the audio and video output of a wirelessly transmitted video conference. At the same time, information obtained during the decoding process can be used to determine the SIR of the signal received by the UE 110 and to perform other quality measurements, e.g., BLER (and/or frame error rate (FER)) calculations. A quality measurement/control logic 28 is included that can calculate the SIR of the signal received by the UE. The calculated SIR is provided to the processor 25.

The measured BLER is processed in the quality measurement/control logic 28 to determine a target SIR, i.e., $SIR_{ref}$, for the downlink. The $SIR_{ref}$ is forwarded to the processor 25 from the quality measurement/control logic 28. Alternatively, BLER information may be forwarded to the processor 25 for processing to determine the $SIR_{ref}$. The $SIR_{ref}$ and the calculated SIR are processed by the processor 25 to determine which power control commands (i.e., "up" or "down") to include in messages to be sent on the uplink for use by the BS in its power control unit (not shown). Alternatively, the quality measurement/control logic 28 can perform some or all of this processing and provide a result to the processor 25. The power control commands are modulated by a modulator 34 and transmitted by a transmitter 32 to the BS.

Figure 5:
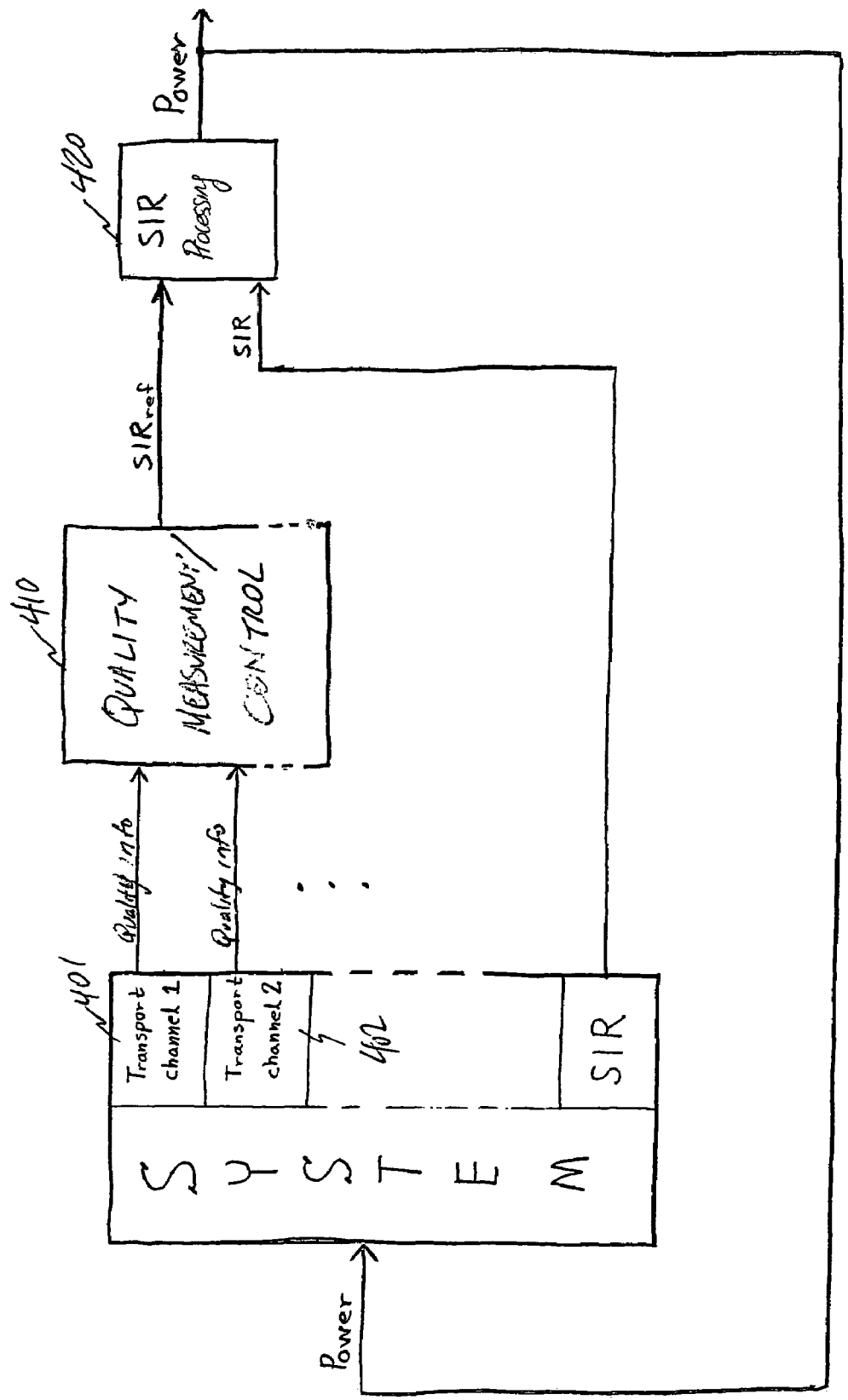
FIG. 5 is a block diagram illustrating power control logic according to an aspect of the invention.

FIG. 5 is a block diagram illustrating the general concept. Quality information, such as BLER, CRC, and BLR information, from multiple transport channels 401, 402, etc., is provided to the quality measurement/control logic 410 to produce the $SIR_{ref}$ for use in inner loop power control on the physical channel. The $SIR_{ref}$ and the current SIR are processed 420 to determine which inner loop power control commands to include in messages sent on the uplink for use by the BS in power control. The SIR processing 420 is shown as a separate logical block, but, as discussed above, this function can either be performed in the quality measurement/control logic 410 or in a separate processor.

According to exemplary embodiments, instead of considering only error rate information for each transport channel individually, convergence time is improved by considering other information, such as quality information from other transport channels and block rate information for the channel to determine an $SIR_{ref}$ to be used for power control. By considering such other information, an improved outer loop power control is achieved, thus reducing the power needed for the physical channel and increasing the capacity of the communication system.

Figure 6:
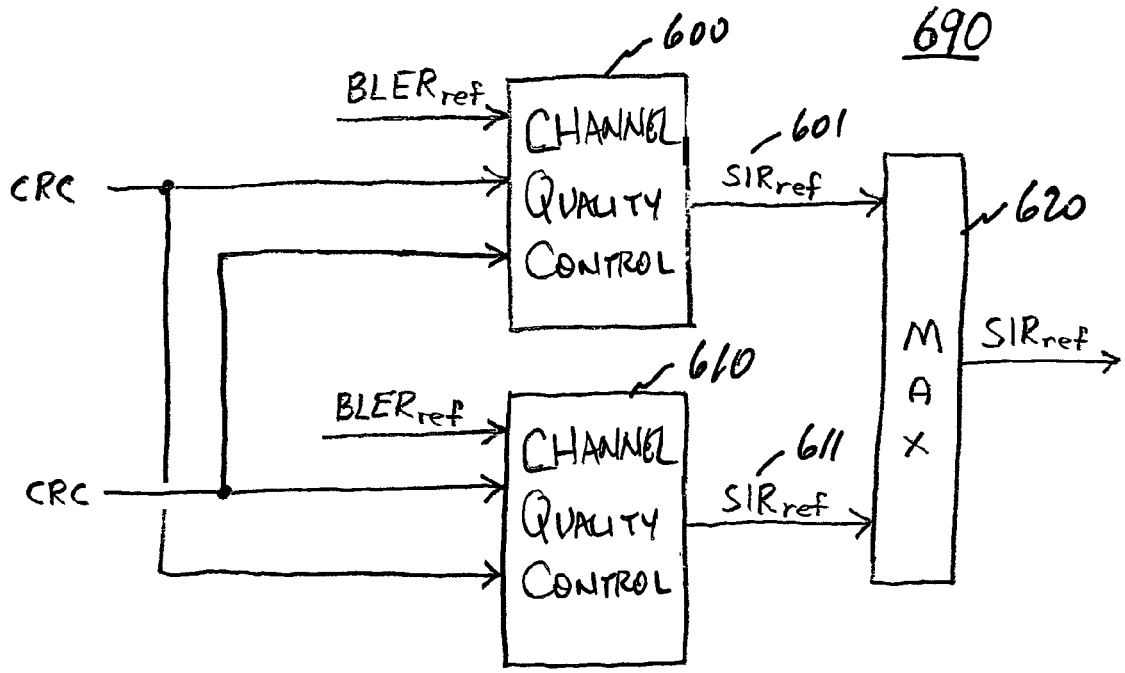
FIG. 6 is a block diagram illustrating power control logic according to another aspect of the invention.

Referring to FIG. 6, one embodiment of the quality measurement/control logic 690 is shown. The quality control for the first and second transport channels 401, 402 is represented logically by blocks 600 and 610, respectively. The quality measurement/control logic 690 processes CRC information, e.g., CRC flags, from other transport channels in addition to the CRC information currently available on the channel being considered. That is, the $SIR_{ref}$ 601, 611 corresponding to each channel is determined according not only to the BLER determined from the CRC information of that channel, but also considers an estimated BLER information derived from the CRC information of other channels that is "fed forward." The feed forward of information may be limited to periods when no CRC information is available on the considered channel or may considered continuously. The fed forward CRC information from the other channels is assigned a weight, i.e., a gain, and combined with the CRC information of the current channel to determine a more accurate BLER for comparison to the $BLER_{ref}$ to determine the corresponding $SIR_{ref}$ 601, 611. The respective $SIR_{ref}$ 601, 611 for each transport channel is then compared 620 to determine the maximum $SIR_{ref}$ for use in inner loop power control.

The CRC information received $CRC_n$ for a channel n that corresponds to another channel m is weighted by a gain $K_{nm}$ according to Equation (5).

$$CRC_n = K_{nm} \cdot CRC_m \qquad (5)$$

where preferably $K_{nm} = BLER_n/BLER_m$

The gain used for the fed forward CRC information depends on the current SIR, the channel coding used on each channel, the code rate used on each channel, and other such factors affecting the BLER. For example, better channel coding (such as using a lower code rate, more redundant bits, etc.) will reduce the BLER. The gain is determined according to a comparison between the parameters of the fed forward channel and the channel to which the CRC is fed forward. Thus, comparatively speaking, better coding on the channel from which the CRC is fed forward increases the gain $K_{nm}$, while better coding on the channel to which the CRC is fed forward decreases the gain $K_{nm}$.

The gain is estimated and need not be perfect. It is therefore possible that the CRCs fed forward and used for other channels will produce biased BLER estimates, resulting in an SIR bias. The bias will, however, decrease as more blocks are received on a given channel compared to the number of blocks received on the channel being fed forward from.

Figure 9:
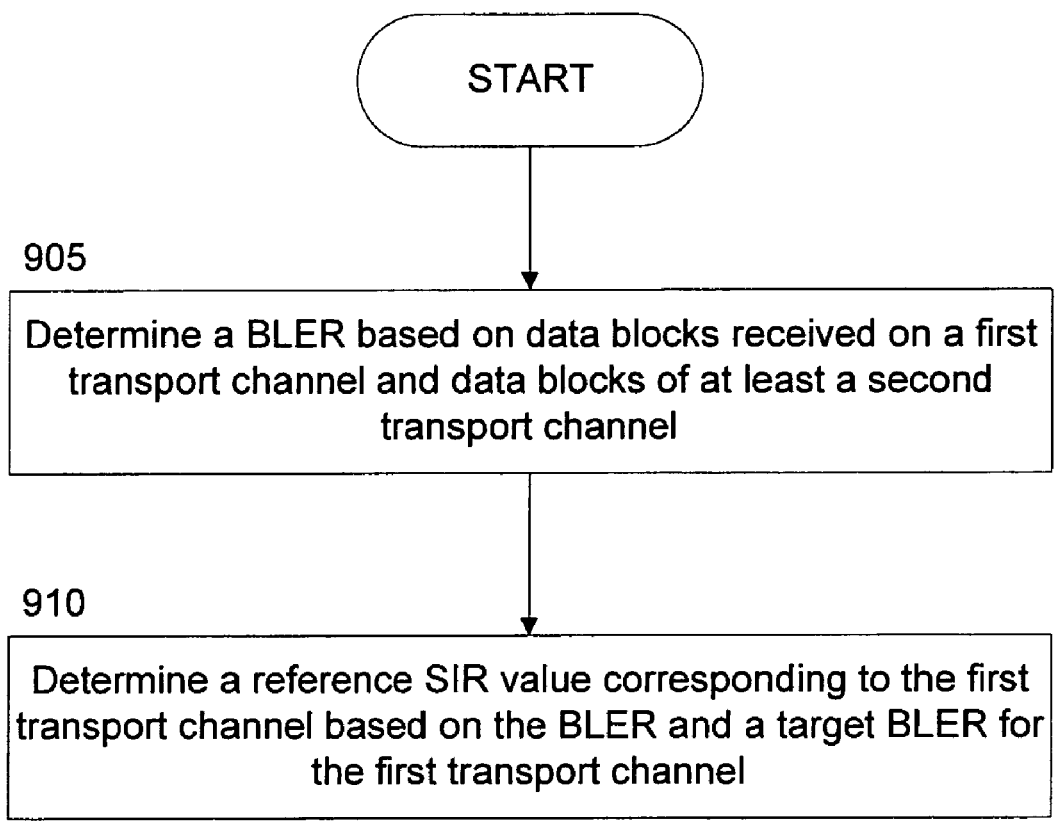
FIG. 9 is a flow chart illustrating a method of power control according to another aspect of the invention.

A method for controlling power according to the embodiment of FIG. 6 is illustrated in FIG. 9. A BLER is determined based on data blocks received on a first transport channel and data blocks of at least a second transport channel (905). A reference SIR value corresponding to the first transport channel is determined based on the BLER and a target BLER for the first transport channel.

Figure 6A:
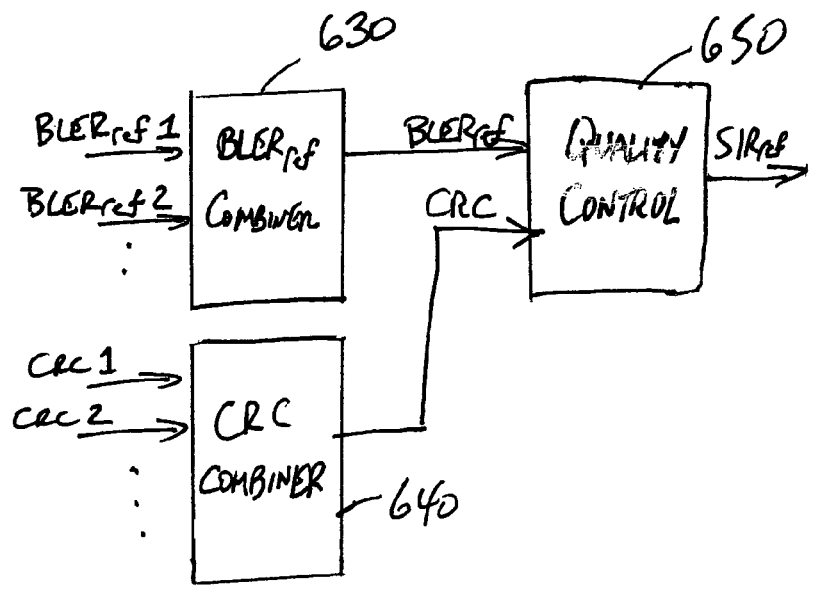
FIG. 6A is a block diagram illustrating power control logic according to another aspect of the invention.

An alternative to the above embodiment is shown in FIG. 6A. The $BLER_{ref}$ for different transport channels are combined 630 into one common $BLER_{ref}$. Similarly, the CRC information for different transport channels are combined 640 into one common CRC. The common $BLER_{ref}$ and CRC are processed 650 to determine the $SIR_{ref}$. In each case, the combining preferably considers respective channel parameters, such as the coding used, and weights the $BLER_{ref}$ and CRC from different channels appropriately, as described above.

Using the quality measurement/control logic 690 of FIG. 6, the $SIR_{ref}$ from a respective transport channel gets updated each time a block arrives on any transport channel, not just on the respective transport channel. Accordingly, the BLR for each transport channel is effectively increased for purposes of $SIR_{ref}$ determination, which improves convergence time, as discussed above.

Figure 10:
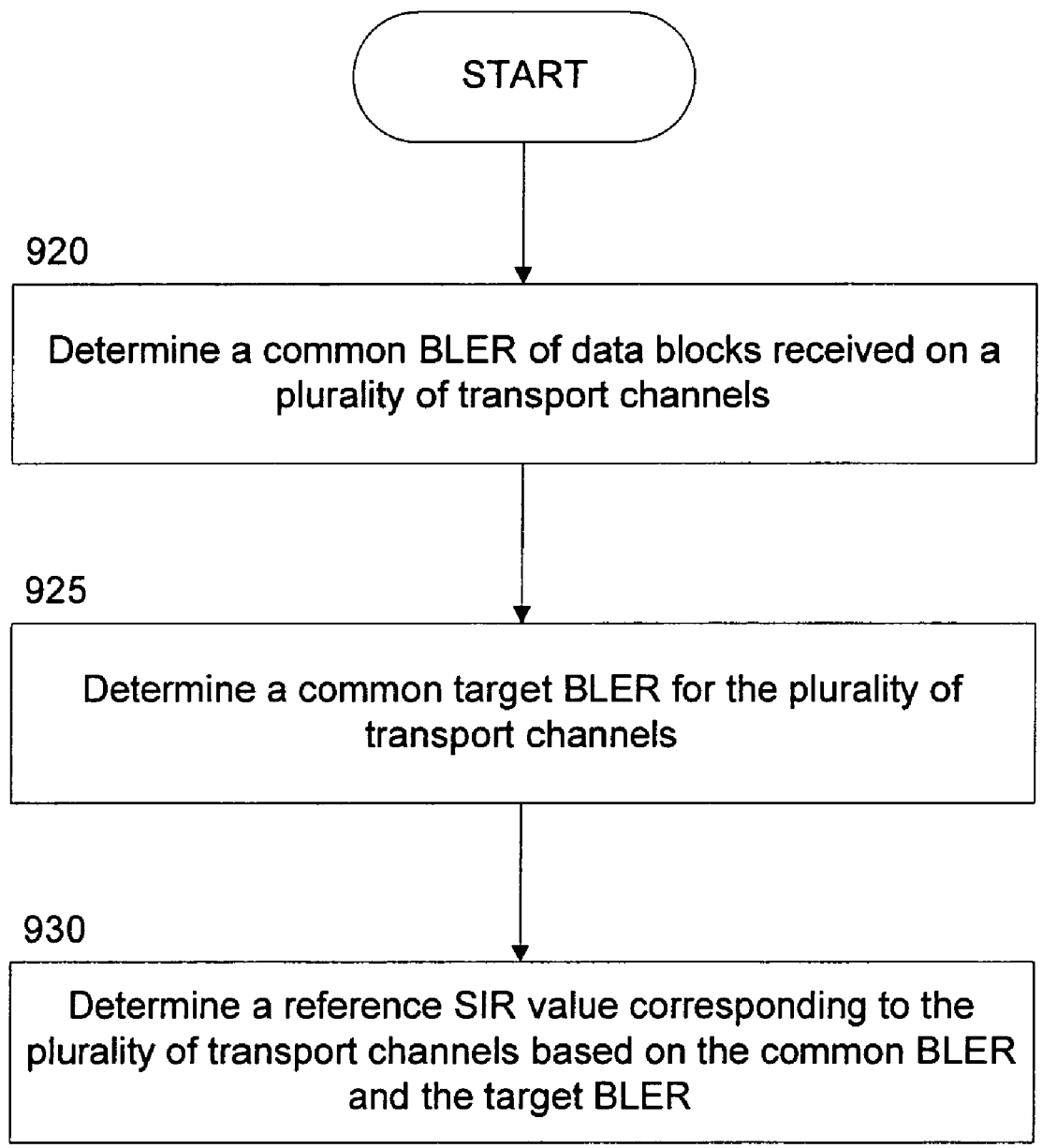
FIG. 10 is a flow chart illustrating a method of power control according to another aspect of the invention.

A method for controlling power according to the embodiment of FIG. 6A is illustrated in FIG. 10. A common BLER of data blocks received on a plurality of transport channels is determined (920). A common target BLER for the plurality of transport channels is also determined (925). A reference SIR value corresponding to the plurality of transport channels is determined based on the common BLER and the target BLER (930).

Figure 7:
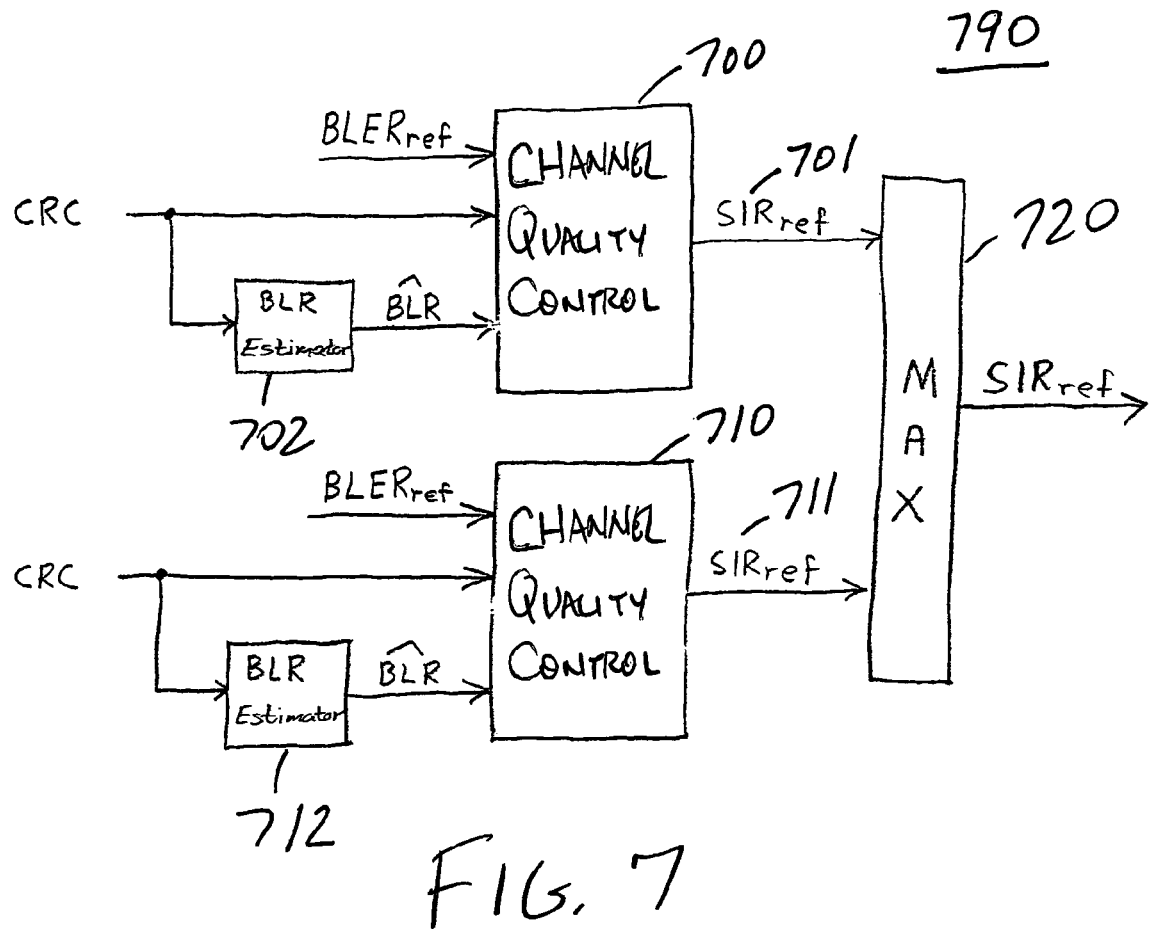
FIG. 7 is a block diagram illustrating power control logic according to another aspect of the invention.

Referring to FIG. 7, another embodiment of the quality measurement/control logic 790 is shown. The quality control for the first and second transport channels 401, 402 is represented logically by blocks 700 and 710, respectively. The quality measurement/control logic 790 processes CRC information for the respective transport channel. In addition, the BLR for each channel is estimated 702, 712 based on the number of blocks received over one or more previous TTIs for the respective channel. The blocks could, for example, be counted when the CRC information is received with each block. In determining the $SIR_{ref}$ 701, 711, the BLER controller is adapted based on the estimated BLR for each respective transport channel. The respective $SIR_{ref}$ 701, 711 for each transport channel is then compared 720 to determine the maximum $SIR_{ref}$ for use in inner loop power control.

Once the estimated BLR is known, the BLER used to determine the respective $SIR_{ref}$ 701, 711 for each transport channel is adapted based on the estimated BLR using a variety of techniques. Parameters within the quality measurement/control logic 790 can be modified according to the estimated BLR to compensate for the deleterious effects on convergence at lower BLRs. For example, the filter time constant α and gain K parameters may be modified (to α' and K') based on the estimated BLR according to Equations (6) and (7). As discussed above, the filter time constant α is set based on the $BLER_{ref}$ so that the same number of block errors are used to determine the BLER estimate. Here, the time constant and gain are modified according to the BLR to maintain the same filter time constant, and the same rate of change (i.e., convergence time) of the $SIR_{ref}$ for each channel independent of the BLR. That is, the convergence time will be the same at low BLRs.

$$\alpha'=\alpha^{1/BLR} \quad (6)$$

$$K'=K/BLR \quad (7)$$

Alternatively, the $SIR_{ref}$ can also be updated at regular intervals, such as with each frame of blocks received on a respective transport channel so that the time constant is independent of the block rate. When no block is received on the channel, a correct block CRC is substituted in (in lieu of no CRC). When an incorrect block arrives, the CRC is weighted with the inverse of the estimated block rate, as shown in Equation (7). Again, the convergence time will be the same at low BLRs.

In yet another alternative using the estimated BLR arrangement of FIG. 7, the $SIR_{ref}$ for transport channels with low excitation may be excluded, so that transport channels with higher excitation, and therefore faster convergence, are used to determine $SIR_{ref}$. One measure of excitation is the rate of block errors per second, which is the product of the BLR and the BLER (which can be approximated as the $BLER_{ref}$). The quality measurement/control logic 790 determines, based on the estimated BLR for each transport channel, whether the corresponding $SIR_{ref}$ 701, 711 should be included in determining the maximum $SIR_{ref}$. The BLR decision threshold $BLR_{thresh}$ of each channel is set according Equation (8) so that a required minimum excitation level X must be met.

$$BLR_{thresh}=X/BLER_{ref} \quad (8)$$

Transport channels with a BLR below $BLR_{thresh}$ are not included in determining the overall $SIR_{ref}$. In order to prevent the possibility that all transport channels are excluded, the overall SIR reference may be kept constant until a transport channel meets the $BLR_{thresh}$. Moreover, the SIR reference could be increased if the cumulative number of block errors across all channels is unusually high but no channel meets the $BLR_{thresh}$.

Another concern with excluding SIR references from channels having a BLR below $BLR_{thresh}$ is that the overall $SIR_{ref}$ may jump between different SIR references. The number of jumps can be reduced using hysteresis. Increasing the BLR estimator time constant would also have a smoothing effect. Note that using turn-off criteria (in lieu of turn-on criteria) has the advantage of SIR control being started immediately, which is important if the initial SIR reference is far from a suitable value.

Figure 11:
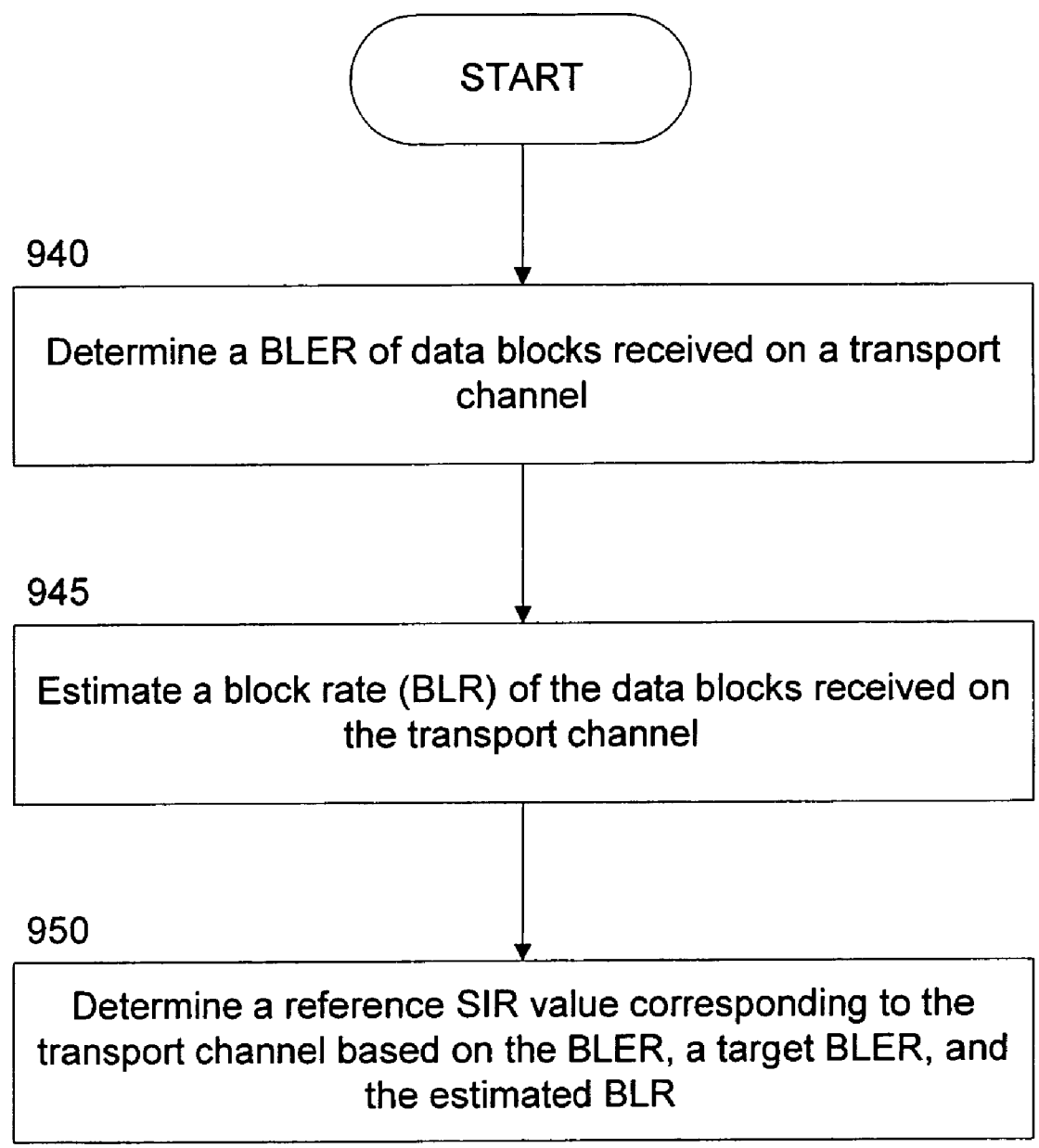
FIG. 11 is a flow chart illustrating a method of power control according to another aspect of the invention.

A method for controlling power according to the embodiment of FIG. 7 is illustrated in FIG. 11. A BLER of data blocks received on a transport channel is determined (940). A BLR of the data blocks received on the transport channel is estimated (945). A reference SIR value corresponding to the transport channel is determined based on the BLER, a target BLER, and the estimated BLR (950).

Figure 8:
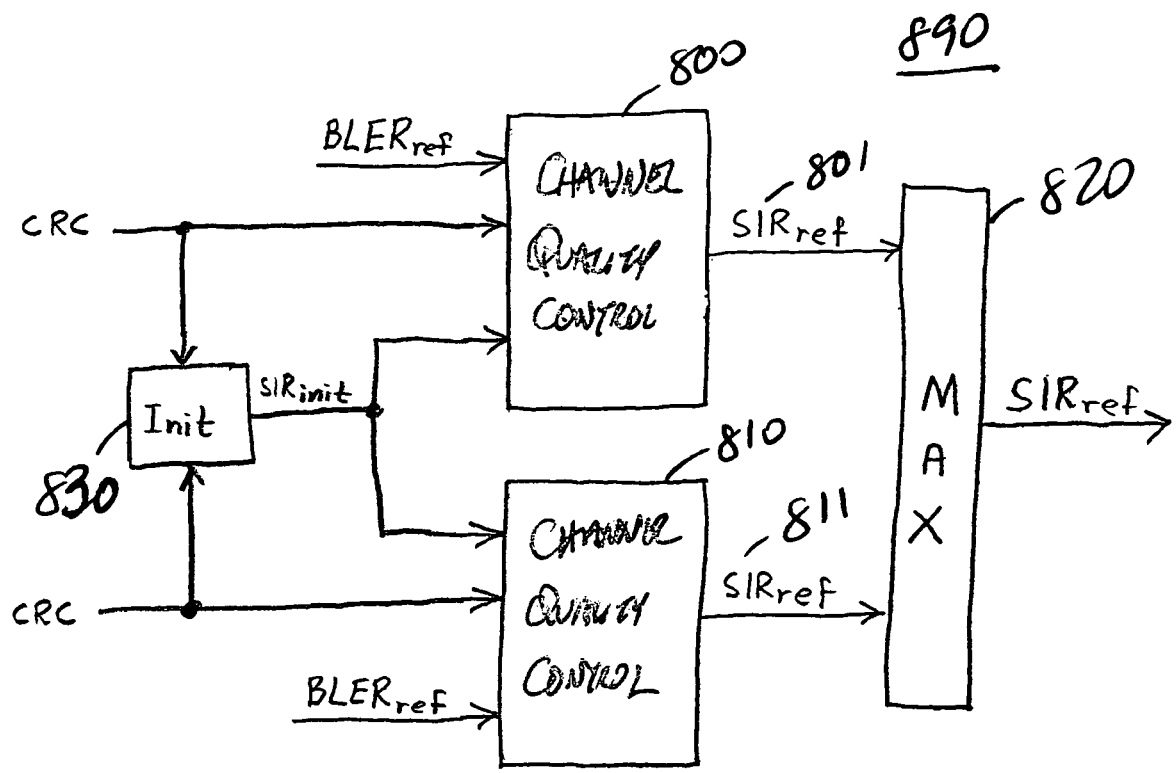
FIG. 8 is a block diagram illustrating power control logic according to another aspect of the invention.

Referring to FIG. 8, another embodiment of the quality measurement/control logic 890 is shown. Here, a more accurate, i.e., closer, initial SIR reference $SIR_{init}$ is determined quickly at initialization, which provides a faster initial convergence to the correct $SIR_{ref}$ for all channels. The $SIR_{init}$ is determined by ramping down the overall $SIR_{ref}$ until a block error occurs on any transport channel. An initialization block 830 monitors the CRCs of the various channels, and once a first block error is detected from any channel, determines $SIR_{init}$ to be the corresponding SIR at which the error occurred. The $SIR_{init}$ value is provided as an initial SIR for all quality control 800, 810 of all channels. Alternatively, instead of acting on the first block error, the initialization block 830 could wait for a certain fixed number of block errors.

Once the initial SIR is determined, any of the above (or other) quality control techniques are implemented to determine an $SIR_{ref}$ 801, 811 for each channel and a maximum 820 $SIR_{ref}$ for use in inner loop power control.

Figure 12:
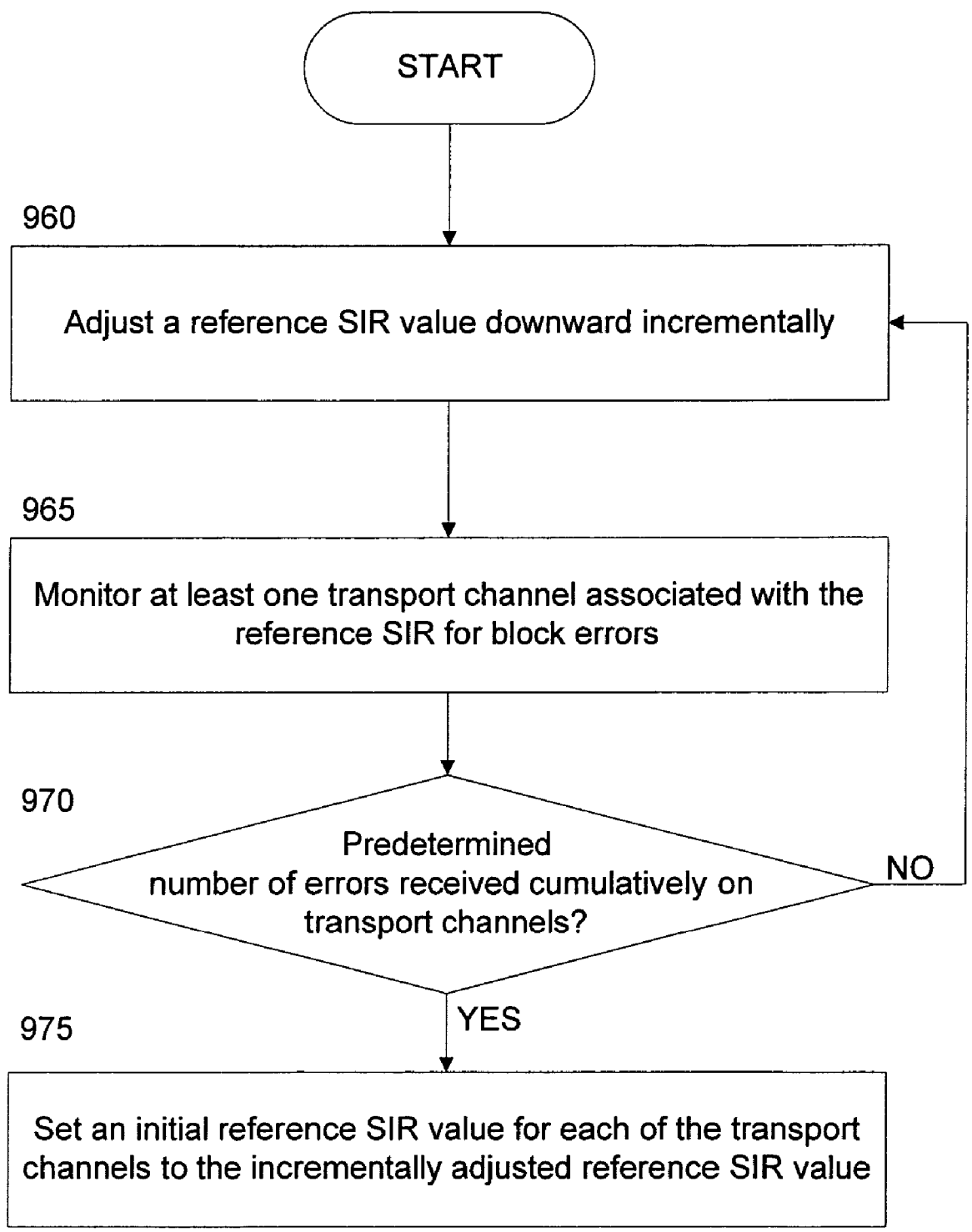
FIG. 12 is a flow chart illustrating a method of power control according to another aspect of the invention.

A method for controlling power according to the embodiment of FIG. 8 is illustrated in FIG. 12. A reference SIR value is adjusted downward incrementally (960). Transport channels associated with the reference SIR are monitored for block errors (965). When a predetermined number of errors are received cumulatively on the transport channels (970), an initial reference SIR value is set for each of the transport channels to the incrementally adjusted reference SIR value (975). Otherwise, the SIR value is adjusted downward another increment and the monitoring continues.

The above embodiments describe the use of CRC information to measure errors in received data on the different transport channels. One of ordinary skill in this art, however, will appreciate that other error measurement criterion may be employed, such as bit error rate (BER), an average number of iterations in the turbo decoder, and an effective signal-to-noise ratio (SNR).

Moreover, while the above embodiments may refer to downlink power control applications by way of example, one of ordinary skill in this art will appreciate that the methods and apparatuses may be applied equally for use in uplink power control.

In addition, while some of the above embodiments are described primarily independent of each other, it should be understood that the techniques described are not meant to be mutually exclusive. That is, the techniques described may be used in various combinations.

It should be emphasized that the terms "comprises" and "comprising", when used in this description and claims, are taken to specify the presence of stated features, steps, or components, but the use of these terms does not preclude the presence or addition of one or more other features, steps, components, or groups thereof.

It will be appreciated by those of ordinary skill in the art that the invention can be embodied in various specific forms without departing from its essential characteristics. The disclosed embodiments are considered in all respects to be illustrative and not restrictive. The scope of the invention is indicated by the appended claims, rather than the foregoing description, and all changes that come within the meaning and range of equivalents thereof are intended to be embraced thereby.

What is claimed is:

1. A method for controlling power in a communication system, comprising:
   determining a block error rate (BLER) corresponding to a first transport channel based on data blocks received on the first transport channel and data blocks of at least a second transport channel; and
   determining a reference signal-to-interference (SIR) value corresponding to the first transport channel based on the BLER and a target BLER for the first transport channel,
   wherein error rate information corresponding to the data blocks of the at least second transport channel is weighted according to at least one of channel coding, a code rate, rate matching, and a current SIR of the first and second transport channels.

2. The method of claim 1, wherein data blocks of at least the second transport channel are only considered for determining the BLER while data blocks are not received on the first transport channel.

3. The method of claim 1, wherein the BLER is determined according to cyclic redundancy check (CRC) information.

4. The method of claim 1, wherein the reference SIR is adjusted so that the BLER approaches the target BLER.

5. The method of claim 1, further comprising:
   comparing the reference SIR value to at least one other reference SIR value corresponding to another transport channel; and
   selecting a maximum one of the compared reference SIR values to be used for controlling power.

6. An apparatus for controlling power in a communication system, comprising:
   logic that determines a block error rate (BLER) corresponding to a first transport channel based on data blocks received on the first transport channel and data blocks of at least a second transport channel;
   logic that determines a reference signal-to-interference ratio (SIR) value corresponding to the first transport channel based on the BLER and a target BLER for the first transport channel; and
   logic that assigns a weight to error rate information corresponding to the data blocks of the at least second transport channel according to at least one of channel coding, a code rate, rate matching, and a current SIR of the first and second transport channels.

7. The apparatus of claim 6, comprising:
   logic that only considers data blocks of at least the second transport channel, in determining the BLER, while data blocks are not received on the first transport channel.

8. The apparatus of claim 6, comprising:
   logic that determines the BLER according to CRC information.

9. The apparatus of claim 6, comprising:
   logic that adjusts the reference SIR so that the BLER approaches the target BLER.

10. The apparatus of claim 6, further comprising:
    logic that compares the reference SIR value to at least one other reference SIR value corresponding to another transport channel; and
    logic that selects a maximum one of the compared reference SIR values to be used for controlling power.

11. A method for controlling power in a communication system, comprising:
    determining common error rate information based on a plurality of individual error rate information received on respective ones of a plurality of transport channels;
    determining a common block error rate (BLER) based on the common error rate information;
    determining a common target BLER based on individual target block error rates for the plurality of transport channels; and
    determining a reference signal-to-interference ratio (SIR) value corresponding to the plurality of transport channels based on the common BLER and the common target BLER, said reference SIR being used for controlling power.

12. The method of claim 11, wherein the step of determining the common error rate information is based on weighting the plurality of individual error rate information according to at least one of channel coding, a code rate, rate matching, and a current SIR value of the plurality of transport channels.

13. The method of claim 11, wherein the step of determining the common target BLER is based on weighting the individual target BLERs according to at least one of channel coding, a code rate, rate matching, and a current SR value of the plurality of transport channels.

14. An apparatus for controlling power in a communication system, comprising:
    logic that determines common error rate information based on a plurality of individual error rate information received on respective ones of a plurality of transport channels;
    logic that determines a common block error rate (BLER) based on the common error rate information;
    logic that determines a common target BLER based on individual target BLERs for the plurality of transport channels; and
    logic that determines a reference signal-to-interference ratio (SIR) value corresponding to the plurality of transport channels based on the common BLER and the common target BLER, said reference SIR being used for controlling power.

15. The apparatus of claim 14, wherein the logic that determines the common error rate information is configured to determine the common error rte information based on weighting the plurality of individual error rate information according to at least one of channel coding, a code rate, rate matching, and a current SIR value of the plurality of transport channels.

16. The apparatus of claim 14, wherein the logic that determines the common target BLER is configured to determine the common target BLER based on weighting the individual target BLERs according to at least one of channel coding, a code rate, rate matching, and a current SIR value of the plurality of transport channels.

17. A method for controlling power in a communication system, comprising:
determining a BLER of data blocks received on a transport channel;
estimating a block rate (BLR) of the data blocks received on the transport channel; and
determining a reference SIR value corresponding to the transport channel based on the BLER, a target BLER, and the estimated BLR, said reference SIR being considered for controlling power,
wherein the estimated BLR is used to maintain a constant rate of change of the determined reference SIR value for different estimated BLRs.

18. The method of claim 17, wherein the BLER is determined based on the estimated BLR.

19. A method for controlling power in a communication system, comprising:
determining a BLER of data blocks received on a transport channel;
estimating a block rate (BLR) of the data blocks received on the transport channel; and
determining a reference SIR value corresponding to the transport channel based on the BLER, a target BLER, and the estimated BLR, said reference SIR being considered for controlling power,
wherein the reference SIR is only considered for controlling power if the estimated BLR corresponds to at least a minimum channel excitation level.

20. The method of claim 19, wherein the channel excitation level is determined based on a product of the estimated BLR and the target BLER.

21. A method for controlling power in a communication system, comprising:
determining a BLER of data blocks received on a transport channel;
estimating a block rate (BLR) of the data blocks received on the transport channel;
determining a reference SR value corresponding to the transport channel based on the BLER, a target BLER, and the estimated BLR, said reference SIR being considered for controlling power;
comparing the reference SIR value to at least one other reference SIR value corresponding to another transport channel; and
selecting a maximum one of the compared reference SIR values to be used for controlling power.

22. An apparatus for controlling power in a communication system, comprising:
logic that determines a BLER of data blocks received on a transport channel;
logic that estimates a BLR of the data blocks received on the transport channel;
logic that determines a reference SIR value corresponding to the transport channel based on the BLER, a target BLER, and the estimated BLR, said reference SIR being considered for controlling power; and
logic that uses the estimated BLR to maintain a constant rate of change of the determined reference SIR value for different estimated BLRs.

23. The apparatus of claim 22, comprising: logic that determines the BLER based on the estimated BLR.

24. An apparatus for controlling power in a communication system, comprising:
logic that determines a BLER of data blocks received on a transport channel;
logic that estimates a BLR of the data blocks received on the transport channel;
logic that determines a reference SIR value corresponding to the transport channel based on the BLER, a target BLER, and the estimated BLR, said reference SIR being considered for controlling power; and
logic that only considers the reference SIR for controlling power if the estimated BLR corresponds to at least a minimum channel excitation level.

25. The apparatus of claim 24, comprising:
logic that determines the channel excitation level based on a product of the estimated BLR and the target BLER.

26. An apparatus for controlling power in a communication system, comprising:
logic that determines a BLER of data blocks received on a transport channel;
logic that estimates a BLR of the data blocks received on the transport channel;
logic that determines a reference SIR value corresponding to the transport channel based on the BLER, a target BLER, and the estimated BLR, said reference SIR being considered for controlling power;
logic that compares the reference SIR value to at least one other reference SIR value corresponding to another transport channel; and
logic that selects a maximum one of the compared reference SIR values to be used for controlling power.

* * * * *

UNITED STATES PATENT AND TRADEMARK OFFICE
CERTIFICATE OF CORRECTION

PATENT NO. : 7,647,063 B2  Page 1 of 1
APPLICATION NO. : 10/763969
DATED : January 12, 2010
INVENTOR(S) : Andersson et al.

It is certified that error appears in the above-identified patent and that said Letters Patent is hereby corrected as shown below:

In Fig. 4, Sheet 4 of 12, for Tag "28", in Line 2, delete "MEASURENT" and insert -- MEASUREMENT --, therefor.

In Column 5, Line 37, delete "estimated. a" and insert -- estimated. A --, therefor.

In Column 12, Line 46, in Claim 13, delete "SR" and insert -- SIR --, therefor.

In Column 12, Line 66, in Claim 15, delete "error rte" and insert -- error rate --, therefor.

In Column 13, Line 50, in Claim 21, delete "SR" and insert -- SIR --, therefor.

Signed and Sealed this

Twenty-second Day of June, 2010

David J. Kappos
*Director of the United States Patent and Trademark Office*